United States Patent
Kim (10) Patent No.: US 10,556,620 B2
(45) Date of Patent: Feb. 11, 2020

(54) APPARATUS AND METHOD FOR COMPENSATING FOR COLUMN TORQUE IN MDPS SYSTEM

(71) Applicant: Hyundai Mobis Co., Ltd., Seoul (KR)

(72) Inventor: Tae Hong Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 204 days.

(21) Appl. No.: 15/689,765

(22) Filed: Aug. 29, 2017

(65) Prior Publication Data

US 2018/0065661 A1    Mar. 8, 2018

(30) Foreign Application Priority Data

Sep. 7, 2016    (KR) .................. 10-2016-0115290

(51) Int. Cl.
  *B62D 5/04*    (2006.01)
  *B62D 6/02*    (2006.01)
  *B62D 6/10*    (2006.01)

(52) U.S. Cl.
  CPC ......... *B62D 5/0472* (2013.01); *B62D 5/0463* (2013.01); *B62D 6/02* (2013.01); *B62D 6/10* (2013.01)

(58) Field of Classification Search
  CPC ...... B62D 5/0472; B62D 5/0463; B62D 6/02; B62D 6/10; B62D 6/06

USPC ......................................................... 701/42
  See application file for complete search history.

(56) References Cited

U.S. PATENT DOCUMENTS

| | | | |
|---|---|---|---|
| 2012/0061169 A1* | 3/2012 | Oblizajek | B62D 5/0472 180/446 |
| 2016/0059885 A1* | 3/2016 | Tsubaki | B62D 5/0472 701/42 |
| 2017/0217484 A1* | 8/2017 | Toda | B62D 6/00 |

* cited by examiner

*Primary Examiner* — Bao Long T Nguyen
(74) *Attorney, Agent, or Firm* — H.C. Park & Associates, PLC (57) ABSTRACT

An apparatus for compensating for a column torque in an MDPS (Motor Driven Power Steering) system including: a column torque sensor configured to sense a column torque applied to a steering shaft and output a column torque signal; a vehicle velocity sensor configured to sense a vehicle velocity; and a controller configured to receive the column torque signal to extract a vibration frequency of steering vibration caused in a steering apparatus, determine a filtering gain based on the vehicle velocity sensed by the vehicle velocity sensor, and filter the column torque signal such that a column torque signal corresponding to the extracted vibration frequency is attenuated to an attenuation length which is determined according to the filtering gain.

18 Claims, 3 Drawing Sheets

APPARATUS AND METHOD FOR COMPENSATING FOR COLUMN TORQUE IN MDPS SYSTEM

CROSS REFERENCE TO RELATED APPLICATION

This application claims priority from and the benefit of Korean Patent Application No. 10-2016-0115290, filed on Sep. 7, 2016, which is hereby incorporated by reference for all purposes as if fully set forth herein.

BACKGROUND

Exemplary embodiments of the present invention relate to an apparatus and method for compensating for a column torque in an MDPS (Motor Driven Power Steering) system, and more particularly, to an apparatus and method for compensating for a column torque in an MDPS system, which can attenuate vibrations caused in a steering apparatus.

DISCUSSION OF THE BACKGROUND

The MDPS system in a vehicle refers to a system that facilitates steering by providing a part of a steering torque which needs to be applied to a steering wheel by a driver, using an auxiliary power source.

The MDPS system determines driving conditions of the vehicle through a torque sensor to measure a driver's steering torque inputted to the steering wheel, a steering angle sensor to measure a steering angle or steering angular velocity of the steering wheel, and a vehicle velocity sensor to measure a vehicle velocity, and provides an assist torque through an electrical motor based on the steering torque which is applied to a steering shaft by the driver's operation of the steering wheel.

In the steering apparatus of the vehicle having the MDPS system mounted therein, various types of vibrations may occur. The vibrations caused in the steering apparatus may include not only vibration caused by a road surface condition, but also vibrations which are caused in the rotational and radial directions of wheels by the structure of a vehicle body or mounting system or a proper wheel alignment. For example, shimmy vibration and brake judder may be included in the vibrations. The shimmy vibration refers to a phenomenon in which the steering wheel unstably vibrates in the rotational direction in a specific vehicle velocity range due to a proper wheel alignment, and the brake judder refers to vibration that is caused by an eccentricity or deformation of a brake disk during a brake operation. Since the shimmy vibration or brake judder is transferred to the steering wheel through a tie rod, rack bar, and column shaft, the shimmy vibration or brake judder may degrade a driver's steering feel and the driving stability.

The above information disclosed in this Background section is only for enhancement of understanding of the background of the inventive concepts. Therefore, it may contain information that does not form the prior art that was already known to a person of ordinary skill in the art or was publically available prior to an effective filing date of subject matter disclosed herein.

SUMMARY

Exemplary embodiments of the present invention provide an apparatus and method for compensating for a column torque in an MDPS system, which is capable of suppressing steering vibrations through steering vibration reduction logic without adding or correcting a mechanical device for reducing vibrations of a steering system, thereby improving a driver's steering feel and steering stability.

An exemplary embodiment of the present invention discloses an apparatus for compensating for a column torque in an MDPS (Motor Driven Power Steering) system, including: a column torque sensor configured to sense a column torque applied to a steering shaft and output a column torque signal; a vehicle velocity sensor configured to sense a vehicle velocity; and a controller configured to receive the column torque signal to extract a vibration frequency of steering vibration caused in a steering apparatus, determine a filtering gain based on the vehicle velocity sensed by the vehicle velocity sensor, and filter the column torque signal such that a column torque signal corresponding to the extracted vibration frequency is attenuated to an attenuation length which is determined according to the filtering gain. The filtering gain may include an index indicating the attenuation degree of the filtered column torque signal.

The controller may filter the column torque signal such that the attenuation length of the column torque signal corresponding to the vibration frequency increases as the filtering gain becomes smaller.

The controller may determine the filtering gain based on the vehicle velocity and a preset vehicle velocity-filtering gain map including information on a vibration occurrence velocity section where the steering vibration occurs, and the vehicle velocity-filtering gain map may include mapping information between a vehicle velocity and a filtering gain for differently attenuating steering vibration which occurs with a different magnitude depending on the vehicle velocity.

The vehicle velocity-filtering gain map may be configured in such a manner that the filtering gain is set to a preset non-compensation gain when the vehicle velocity is not included in the vibration occurrence velocity section, and set to a positive number less than the non-compensation gain when the vehicle velocity is included in the vibration occurrence vehicle section.

The controller may receive the column torque signal to extract the vibration magnitude of the steering vibration, determine the filtering gain by further considering the extracted vibration magnitude when the vehicle velocity is included in the vibration occurrence velocity section, and set the filtering gain to a smaller value as the vibration magnitude becomes larger.

The controller may extract the vibration frequency and the vibration magnitude using DFT (Discrete Fourier Transform).

The controller may filter the column torque signal using a lead-lag compensator having a transfer function that uses the vibration frequency as a center frequency and uses the filtering gain as an attenuation factor.

The non-compensation gain may be set to 1.

The apparatus may further include a steering angle sensor configured to sense a steering angular velocity of the steering wheel. The controller may receive the column torque signal, the vehicle velocity and the steering angular velocity from the column torque sensor, the vehicle velocity sensor and the steering angle sensor, respectively, calculate a damping torque based on the column torque and the steering angular velocity depending on the vehicle velocity, and calculate an adaptive damping torque by multiplying the damping torque by an adaptive damping gain which is determined based on the filtering gain. The adaptive damping gain may be equal to or greater than 1, and set to a larger value below a preset upper limit, as the filtering gain becomes smaller.

The controller may calculate a main assist torque from the filtered column torque signal using a preset boost curve, and calculate a final assist torque based on the main assist torque and the adaptive damping torque.

An exemplary embodiment of the present invention also discloses a method for compensating for a column torque in an MDPS system, including: receiving, by a controller implemented by a processor, a column torque signal and a vehicle velocity from a column torque sensor and a vehicle velocity sensor, respectively; analyzing, by the controller, the steering vibration by extracting a vibration frequency of steering vibration caused in a steering apparatus from the column torque signal; deciding, by the controller, a filtering gain based on the vehicle velocity; and filtering, by the controller, the column torque signal such that a column torque signal corresponding to the extracted vibration frequency is attenuated to an attenuation length which is determined according to the filtering gain. The filtering gain is an index indicating an attenuation degree of the filtered column torque signal. In the filtering of the column torque signal, the controller may filter the column torque signal such that the attenuation length of the column torque signal corresponding to the vibration frequency increases as the filtering gain is smaller.

In the deciding of the filtering gain, the controller may determine the filtering gain based on the vehicle velocity and a preset vehicle velocity-filtering gain map including information on a vibration occurrence velocity section where the steering vibration occurs. The vehicle velocity-filtering gain map may include mapping information between a vehicle velocity and a filtering gain for differently attenuating steering vibration which occurs with a different magnitude depending on the vehicle velocity.

The vehicle velocity-filtering gain map may be configured in such a manner that the filtering gain is set to a preset non-compensation gain when the vehicle velocity is not included in the vibration occurrence velocity section, and set to a positive number less than the non-compensation gain when the vehicle velocity is included in the vibration occurrence vehicle section.

In the analyzing of the steering vibration, the controller may further extract the vibration magnitude of the steering vibration from the column torque signal. In the deciding of the filtering gain, the controller may determine the filtering gain by further considering the extracted vibration magnitude when the vehicle velocity is included in the vibration occurrence velocity section, and set the filtering gain to a smaller value as the vibration magnitude becomes larger.

In the analyzing of the steering vibration, the controller may extract the vibration frequency and the vibration magnitude using DFT.

In the filtering of the column torque signal, the controller may filter the column torque signal using a lead-lag compensator having a transfer function that uses the vibration frequency as a center frequency and uses the filtering gain as an attenuation factor, and the non-compensation gain may be set to 1.

The method may further include: receiving, by the controller, a steering angular velocity of a steering wheel from a steering angle sensor; calculating, by the controller, a damping torque based on the column torque and the steering angular velocity depending on the vehicle velocity; and calculating, by the controller, an adaptive damping torque by multiplying the damping torque by an adaptive damping gain which is determined based on the filtering gain. The adaptive damping gain may be equal to or greater than 1, and set to a larger value below a preset upper limit, as the filtering gain becomes smaller.

The method may further include: calculating, by the controller, a main assist torque from the filtered column torque signal using a preset boost curve; and calculating a final assist torque based on the main assist torque and the adaptive damping torque.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
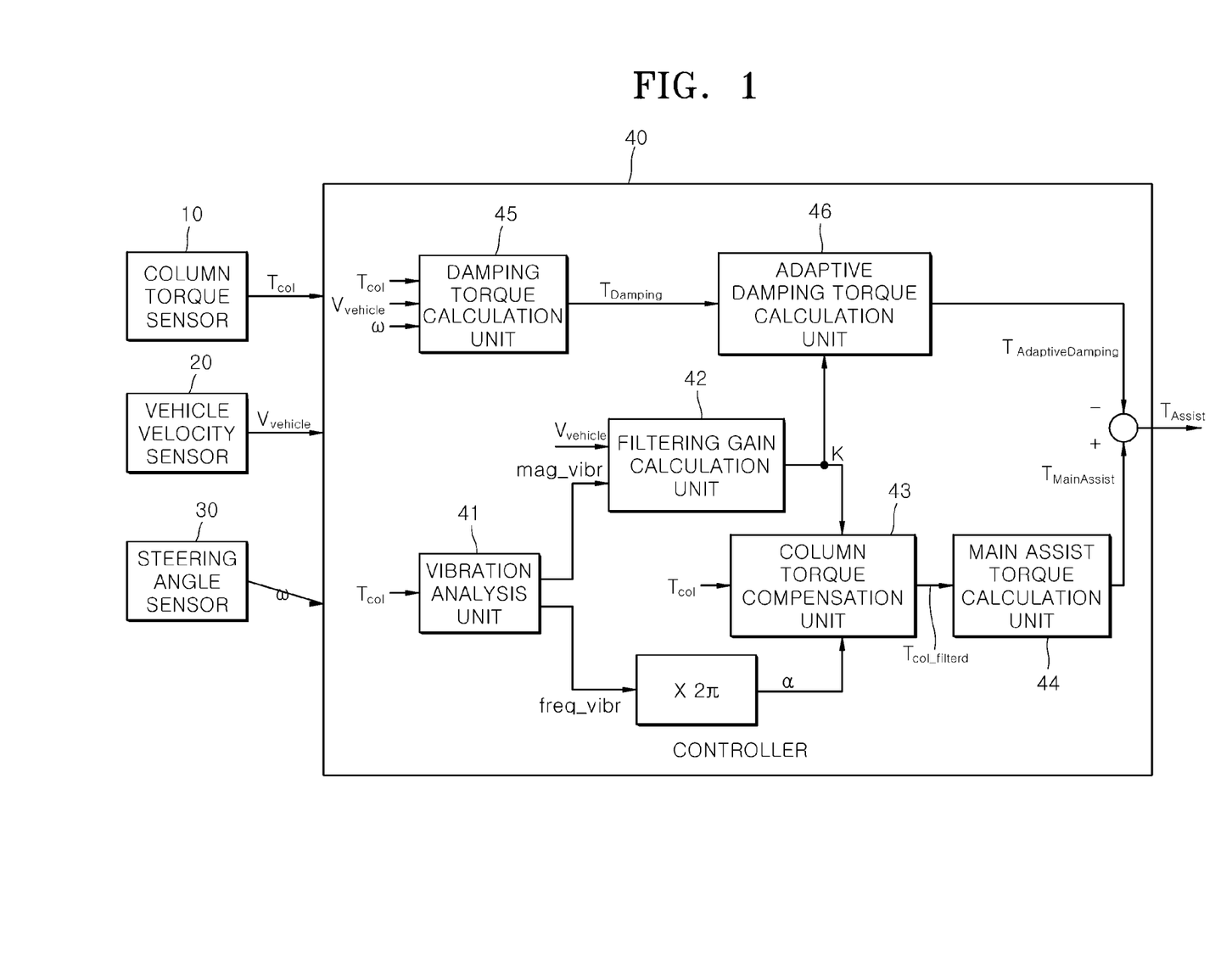
FIG. 1 is a block diagram illustrating an apparatus for compensating for a column torque in an MDPS system in accordance with an exemplary embodiment of the present invention.

FIG. 1 is a block diagram illustrating an apparatus for compensating for a column torque in an MDPS system in accordance with an exemplary embodiment of the present invention.

Referring to FIG. 1, the apparatus for compensating for a column torque in an MDPS system in accordance with an exemplary embodiment of the present invention may include a column torque sensor 10, a vehicle velocity sensor 20, a steering angle sensor 30, and a controller 40, and the controller 40 may include a vibration analysis unit 41, a filtering gain calculation unit 42, a column torque compensation unit 43, a main assist torque calculation unit 44, a damping torque calculation unit 4,5 and an adaptive damping torque calculation unit 46. As is well-known, the controller 40 may be implemented by one or more processors.

The column torque sensor 10 may detect a column torque applied to a steering shaft by a driver's operation of a steering wheel, and output a column torque signal Tcol to the controller 40 described later. The column torque signal Tcol may include not only the column torque applied to the steering shaft, but also a steering vibration component, such as shimmy vibration or brake judder, and the controller 40 may receive the column torque signal Tcol, filter the steering vibration component, and output a main assist torque TMainAssist. As described later, the column torque signal Tcol may be inputted to the vibration analysis unit 41, the column torque compensation unit 43, and the damping torque calculation unit 45, and may be used to extract a vibration frequency freq_vibr and vibration magnitude mag_vibr, filter the column torque signal Tcol, and calculate a damping torque TDamping.

The vehicle velocity sensor 20 may detect the velocity Vvehicle of a vehicle in operation. The vehicle velocity sensor 20 may include various sensors such as a sensor to sense a vehicle velocity using the angular velocity of a wheel, a sensor to sense a vehicle velocity by measuring an engine RPM (Revolution Per Minute), and a sensor to sense a vehicle velocity using GPS (Global Positioning System). The vehicle velocity Vvehicle sensed by the vehicle velocity sensor 20 may be inputted to the filtering gain calculation unit 42 and the damping torque calculation unit 45, and be used to calculate a filtering gain K and a damping torque TDamping, respectively.

The steering angle sensor 30 may sense a steering angular velocity ω of the steering wheel. The steering angle sensor may include an optical sensor to sense the steering angular velocity ω. Also, the steering angle sensor 30 may measure a steering angle and differentiate the measure steering angle with respect to time, in order to sense the steering angular velocity ω. The steering angular velocity ω sensed by the steering angle sensor may be inputted to the damping torque calculation unit 45, and used to calculate the damping torque TDamping, as described later.

The controller 40 may receive the column torque signal Tcol, extract the vibration frequency freq_vibr of the steering vibration caused in the steering apparatus, determine the filtering gain K based on the vehicle velocity Vvehicle sensed by the vehicle velocity sensor 20, and filter the column torque signal Tcol such that the column torque signal Tcol corresponding to the extracted vibration frequency freq_vibr is attenuated to an attenuation length which is determined according to the filtering gain K. Hereafter, the operation process of the controller 40 will be described in detail, focusing on the components of the controller 40.

The vibration analysis unit 41 may receive the column torque signal Tcol from the column torque sensor 10, and extract the vibration frequency freq_vibr and vibration magnitude mag_vibr of the steering vibration caused in the steering apparatus.

In general, the vibration frequency band of steering vibrations caused in the steering apparatus, such as shimmy vibration and brake judder, may range from 10 Hz to 20 Hz. The vibration analysis unit 41 can extract the vibration frequency freq_vibr and the vibration magnitude mag_vibr of steering vibrations which are occurring in the frequency band of 10 Hz to 20 Hz. The extracted vibration frequency freq_vibr may be inputted to the column torque compensation unit 43, and be used to attenuate a column torque signal corresponding to the vibration frequency freq_vibr. The extracted vibration magnitude mag_vibr may be inputted to the filtering gain calculation unit 42, and used to calculate the filtering gain K.

The vibration analysis unit 41 may use DFT (Discrete Fourier Transform) to extract the vibration frequency freq_vibr and the vibration magnitude mag_vibr from the column torque signal Tcol. Since the DFT is well-known to those skilled in the art to which the present invention pertains, the detailed descriptions thereof are omitted herein.

When the extracted vibration frequency freq_vibr is inputted to the column torque compensation unit 43, a predetermined operation (X 2□) for transforming the unit of Hz into the unit of angular velocity (rad/sec) may be performed.

The filtering gain calculation unit 42 may determine the filtering gain K based on the vehicle velocity Vvehicle sensed by the vehicle velocity sensor 20. The filtering gain K may be defined as an index indicating the attenuation degree of the filtered column torque signal. That is, the filtering gain K may determine the attenuation length of the column torque signal corresponding to the vibration frequency freq_vibr. Specifically, the filtering gain K calculated by the filtering gain calculation unit 42 may be inputted to the column torque compensation unit 43, and the column torque compensation unit 43 may attenuate the column torque signal corresponding to the vibration frequency freq_vibr, using a transfer function of which the attenuation length is determined according to the filtering gain K.

As described later, the column torque compensation unit 43 may filter the column torque signal Tcol such that the attenuation length of the column torque signal corresponding to the vibration frequency freq_vibr increases as the filtering gain K decreases. That is, smaller filtering gains K can improve the attenuation effect for the steering vibration component contained in the column torque signal Tcol. Therefore, the filtering gain calculation unit 42 may determine the filtering gain K differently based on the vehicle velocity and the vibration magnitude mag_vibr, such that the optimized filtering can be performed on steering vibrations which are occurring.

The process of deciding the filtering gain K will be described in detail.

The filtering gain calculation unit 42 may determine the filtering gain K based on and the vehicle velocity Vvehicle and a preset vehicle velocity-filtering gain map containing information on a vibration occurrence velocity section where steering vibrations occur. The vehicle velocity-filtering gain map may indicate mapping information between a vehicle velocity and a filtering gain for differently attenuating a steering vibration which occurs with a different magnitude depending on the vehicle velocity.

Specifically, a steering vibration of the steering apparatus may occur at a specific vehicle velocity, and the magnitude of the steering vibration may be changed depending on the vehicle velocity. In general, the steering vibration is known to occur in a vehicle velocity section of 100 Km/h to 130 Km/h, and the magnitude of the steering vibration (vibration torque) is known to gradually increase and then decrease after reaching the peak value in the vehicle velocity section. Therefore, the vehicle velocity-filtering gain map may be set in advance, the vehicle velocity-filtering gain map containing the information on the vibration occurrence velocity section in which a steering vibration occurs and the magnitude information of the steering vibration depending on the vibration occurrence velocity section, and the filtering gain K corresponding to the detected vehicle velocity Vvehicle sensed by the vehicle velocity sensor 20 may be determined.

Figure 2:
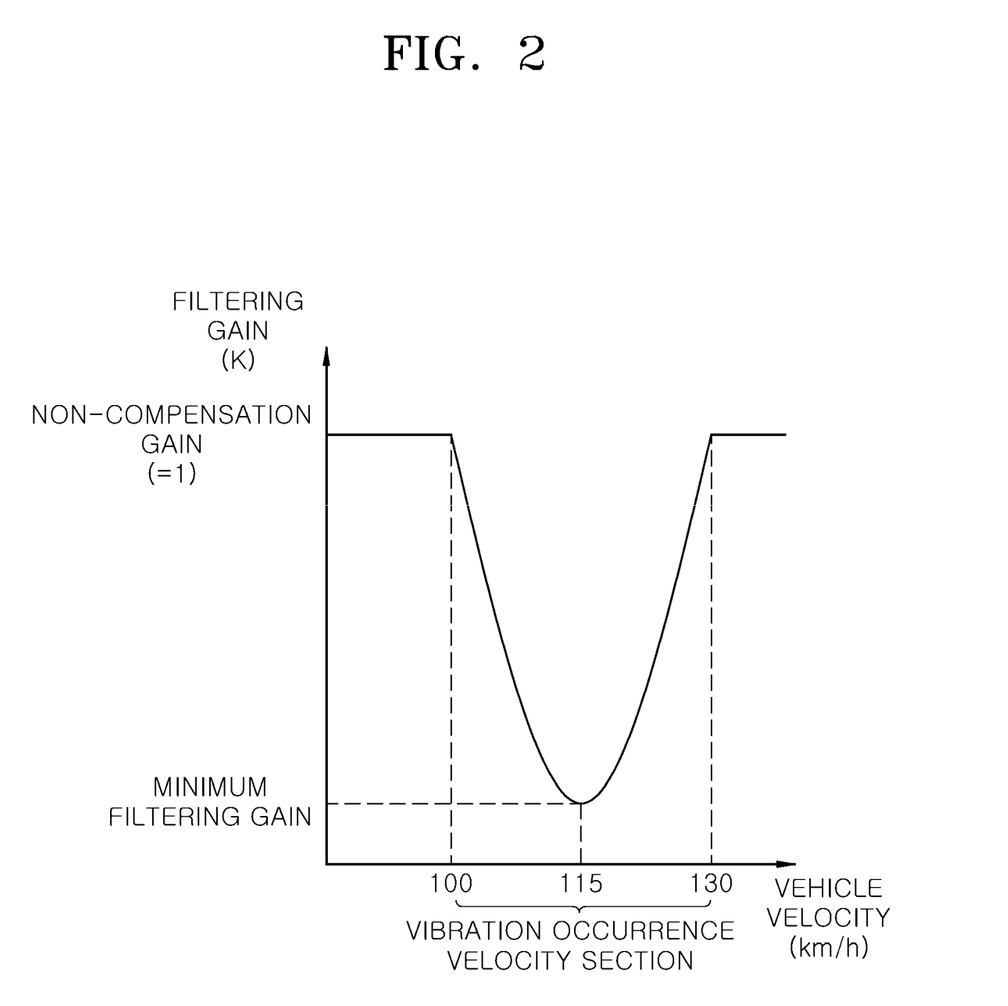
FIG. 2 illustrates a vehicle velocity-filtering gain map in the apparatus for compensating for a column torque in an MDPS system in accordance with an exemplary embodiment of the present invention.

The vehicle velocity-filtering gain map may include various methods, such as a 2D map indicating the corresponding relation between a vehicle velocity and a filtering gain K, a lookup table, and a function of a filtering gain with respect to a vehicle velocity. FIG. 2 illustrates the vehicle velocity-filtering gain map set to a 2D map in the apparatus for compensating for a column torque in an MDPS system in accordance with an exemplary embodiment of the present invention.

In the vehicle velocity-filtering gain map illustrated in FIG. 2, the vibration occurrence velocity section in which steering vibrations occur may be set in the range of 100 Km/h to 130 Km/h, and the filtering gain K may be set to a preset non-compensation gain (=1) in sections other than the vibration occurrence velocity section, and set to a positive number less than the non-compensation gain in the vibration occurrence velocity section. That is, since no steering vibrations occur in the sections other than the vibration occurrence velocity section, the filtering gain K may be set to the non-compensation gain such that the column torque compensation unit 43 does not perform filtering on the column torque signal Tcol. Furthermore, since steering vibrations occur in the vibration occurrence velocity section, the filtering gain K may be set to a smaller positive number than the non-compensation gain such that the column torque compensation unit 43 can perform filtering on the column torque signal corresponding to the vibration frequency freq_vibr.

Referring to the filtering gain K corresponding to the vibration occurrence velocity section in FIG. 2, the magnitude of steering vibration may be increased with the increase of the vehicle velocity in a vehicle velocity section of 100 Km/h to 115 Km/h. Thus, the filtering gain K may be set to a smaller value in order to increase the attenuation length of the column torque signal corresponding to the vibration frequency freq_vibr. Since the magnitude of the steering vibration is maximized at a vehicle velocity of 115 Km/h, the filtering gain K may be set to the minimum filtering gain in order to maximize the attenuation length of the column torque signal corresponding to the vibration frequency freq_vibr. The minimum filtering gain may be designed in various ways depending on the specifications of a vehicle and MDPS motor, a designer's intention and a test, and set in the controller 40 in advance. In a vehicle velocity section of 115 Km/h to 120 Km/h, the magnitude of the steering vibration may be decreased with an increase in the vehicle velocity. Thus, the filtering gain K may be set to a larger value to decrease the attenuation length of the column torque signal corresponding to the vibration frequency freq_vibr.

FIG. 2 is only an example for promoting understanding of the present embodiment, and the specific relationship between the vehicle velocity and the filtering gain may be set in various ways depending on the specification of a vehicle, a designer's intention and a test. The value of the filtering gain and the vibration occurrence velocity section may not be limited to the values and the vehicle velocity range in FIG. 2, but be set in various ways based on a test result obtained by measuring the magnitude of a steering vibration according to a vehicle velocity.

As described above, the filtering gain K may be determined based on the vehicle velocity, but the vehicle velocity-filtering gain map may not reflect the actual magnitude mag_vibr of a steering vibration which is currently occurring. Therefore, the filtering gain calculation unit 42 may further consider the vibration magnitude mag_vibr extracted by the vibration analysis unit 41 in order to improve the accuracy of the filtering gain calculation process.

Specifically, when the vehicle Vvehicle sensed by the vehicle velocity sensor 20 is included in the vibration occurrence velocity section, the filtering gain calculation unit 42 may determine the filtering gain K by further considering the vibration magnitude mag_vibr extracted by the vibration analysis unit 41. At this time, the larger the extracted vibration magnitude mag_vibr, the smaller the value of the filtering gain K may be set. That is, the filtering gain calculation unit 42 may further consider the actual vibration magnitude mag_vibr of the current steering vibration for the filtering gain K based on the vehicle velocity-filtering gain map, and compensate for the filtering gain K according to the vibration magnitude mag_vibr, thereby more effectively attenuating the vibration component contained in the column torque signal Tcol.

More specifically, even though the column torque signal Tcol is filtered according to the filtering gain K, which is determined based on the vehicle velocity-filtering gain map, it may be determined that the vibration component contained in the column torque signal Tcol cannot be sufficiently attenuated, when the extracted vibration magnitude mag_vibr is relatively large. In this case, the filtering gain calculation unit 42 may perform a correction to decrease the filtering gain K, such that the vibration component contained in the column torque signal Tcol is sufficiently attenuated. On the other hand, when the extracted vibration magnitude mag_vibr is relatively small, the filtering gain calculation unit 42 may perform correction to increase the filtering gain K, thereby not only attenuating only the vibration component, but also preventing an attenuation of the normal column torque signal Tcol by the low filtering gain K.

In this case, the filtering gain calculation unit 42 may compare the magnitude of a steering vibration for a vehicle velocity, set in the vehicle velocity-filtering gain map, to the extracted vibration magnitude mag_vibr, and determine whether to correct the filtering gain K. Also, the filtering gain calculation unit 42 may correct the filtering gain K by adding/subtracting a preset correction amount to/from the filtering gain K such that the filtering gain K is proportional to a difference between the magnitude of the steering vibration for the vehicle velocity and the extracted vibration magnitude mag_vibr.

In the above-described configuration, the filtering gain K corresponding to the vehicle velocity Vvehicle may be determined based on the vehicle velocity-filtering gain map, or determined through the correction process which further considers the extracted vibration magnitude mag_vibr for the determined filtering gain K. In another exemplary embodiment, however, a filtering gain K corresponding to a vehicle velocity Vvehicle sensed by the vehicle velocity sensor 20 and an extracted vibration magnitude mag_vibr may be determined from a preset vehicle velocity-vibration magnitude-filtering gain map. The vehicle velocity-vibration magnitude-filtering gain map may be set to a variety of methods such as a 3D map indicating the corresponding relation among the vehicle velocity, the vibration magnitude and the filtering gain, a lookup table, and a filtering gain function using the vehicle velocity and vibration magnitude mag_vibr as variables.

The column torque compensation unit 43 may filter the column torque signal Tcol such that the column torque signal corresponding to the vibration frequency freq_vibr extracted by the vibration analysis unit 41 is attenuated to the attenuation length which is determined according to the filtering gain K. At this time, the column torque compensation unit 43 may filter the column torque signal Tcol through a lead-lag compensator having a transfer function that uses the extracted vibration frequency freq_vibr as the center frequency and uses the filtering gain K as an attenuation factor. The transfer function of the lead-lag compensator may be determined according to Equations 1 and 2 below.

$$H_1(s) = K_{c1} \frac{s+\alpha}{s+\frac{\alpha}{K}} \quad \text{[Equation 1]}$$

$$H_2(s) = K_{c2} \frac{s+\alpha}{s+\alpha K} \quad \text{[Equation 2]}$$

$$H(s) = H_1(s) + H_2(s) \quad \text{[Equation 3]}$$

Here, Kc1 and Kc2 represent the total gains of the respective transfer functions, a represents the center frequency, and K represents the attenuation factor.

H1(s) of Equation 1 represents the transfer function of the lead compensator, H2(s) of Equation 2 represents the transfer function of the lag compensator, and H(s) of Equation 3 represents the transfer function of the lead-lag compensator. Since the lead-lag compensator serves to attenuate the column torque signal corresponding to the vibration frequency freq_vibr, the total gains Kc1 and Kc2 of the respective transfer functions may be set to 1. However, Equations 1 to 3 are only examples of the transfer functions which can be applied to the lead-lag compensator, and various other types of transfer functions for attenuating the column torque signal Tcol at the center frequency may be used.

Basically, the lead compensator may exhibit the characteristic of a high-pass filter, and the lag compensator may exhibit the characteristic of a low-pass filter. Thus, when the lead compensator and the lag compensator are connected in series to each other after proper cutoff frequencies are set in the lead compensator and the lag compensator, the lead compensator and the lag compensator may function as a band-reject filter. When the zero points of the respective transfer functions of the lead compensator and the lag compensator are set to the same frequency, the attenuation of an input signal can be maximized at the corresponding zero-point frequency. Therefore, in the present exemplary embodiment, the zero-point frequencies of the lead compensator and the lag compensator may be set to the vibration frequency freq_vibr (that is, the center frequency may be set to the vibration frequency freq_vibr), and the attenuation factor may be set to the filtering gain K to filter the column torque signal Tcol through the lead-lag compensator connected in series. While the attenuation length is controlled according to the filtering gain K, the column torque signal corresponding to the vibration frequency freq_vibr can be attenuated, and a phase margin can be secured to improve the phase characteristic.

The process of controlling the attenuation length according to the filtering gain K will be described in detail as follows. First, the lead-lag compensator having the transfer function of Equation 3 may exhibit a characteristic in which the attenuation length at the center frequency increases as the attenuation factor decreases. Therefore, when the vehicle velocity Vvehicle is included in the vibration occurrence velocity section such that the filtering gain K is set to a smaller value than the non-compensation gain (=1), the column torque signal corresponding to the vibration frequency freq_vibr may be attenuated to the attenuation length which is determined according to the filtering gain K. As the filtering gain K is decreased, the attenuation length of the column torque signal corresponding to the vibration frequency freq_vibr may be increased to further reduce the vibration component. Furthermore, when the filtering gain K is set to the non-compensation gain (=1) because the vehicle velocity Vvehicle is not included in the vibration occurrence velocity section, the transfer functions of Equations 1 and 2 may be set to 1, and a filtering operation for the column torque signal Tcol may not be performed.

In short, the column torque compensation unit 43 may attenuate the column torque signal corresponding to the vibration frequency freq_vibr through the lead-lag compensator having the transfer function that uses the vibration frequency freq_vibr extracted by the vibration analysis unit 41 as the center frequency and uses the filtering gain K as the attenuation factor, the filtering gain being determined based on the vehicle velocity and vibration magnitude mag_vibr. At this time, the column torque compensation unit 43 may determine a transfer function in real time according to the vibration frequency freq_vibr and the filtering gain K which are determined in real time, thereby optimizing the lead-lag compensator to effectively reduce steering vibrations.

The main assist torque calculation unit 44 may calculate the main assist torque TMainAssist from the filtered column torque signal using a preset boost curve. The boost curve may indicate a preset function to calculate the main assist torque from the column torque signal. Thus, the main assist torque calculation unit 44 may calculate the main assist torque TMainAssist based on the input column torque signal Tcol and a boost gain proportional to the vehicle velocity. Since the process of calculating the main assist torque TMainAssist from the column torque signal Tcol using the boost curve is well-known to those skilled in the art to which the present invention pertains, the detailed descriptions thereof are omitted herein.

The damping torque calculation unit 45 may receive the column torque signal Tcol, the vehicle velocity Vvehicle and the steering angular velocity ω from the column torque sensor 10, the vehicle velocity sensor 20 and the steering angle sensor 30, respectively, and calculate a damping torque TDamping for returning the steering wheel, based on the column torque and the steering angular velocity ω depending on the vehicle velocity Vvehicle.

The adaptive damping torque calculation unit 46 may calculate an adaptive damping torque TAdaptiveDamping by multiplying the damping torque TDamping by an adaptive damping gain which is determined based on the filtering gain K. The adaptive damping torque TAdaptiveDamping may be obtained by adding an additional damping assist torque to the damping torque TDamping in order to effectively reduce steering vibrations by increasing the convergence of the steering wheel. The adaptive damping torque TAdaptiveDamping may be calculated by multiplying the damping torque TDamping and the adaptive damping gain. The adaptive damping gain may be equal to or greater than 1. For smaller filtering gains K, the adaptive damping gain may be set to larger values below a preset upper limit.

Specifically, the adaptive damping torque calculation unit 46 may determine the adaptive damping gain based on the filtering gain K, determine that the vibration component which needs to be attenuated in the column torque signal Tcol is large as the filtering gain K is small, and set the adaptive damping gain to a relatively large value. As the adaptive damping gain is increased, the adaptive damping torque TAdaptiveDamping may also be increased. Thus, the convergence of the steering wheel can be improved to effectively reduce steering vibrations which may be felt by the driver from the steering wheel.

As described above, the adaptive damping gain may be equal to or greater than 1. For smaller filtering gains K, the adaptive damping gain may be set to larger values below the preset upper limit. For this configuration, a 2D map indicating the corresponding relation between the filtering gain K and the adaptive damping gain, a lookup table or a function of the adaptive damping gain with respect to the filtering gain K may be set in the adaptive damping torque calculation unit 46. For example, the function of the adaptive damping gain may be set to (−C*filtering gain), where C is a constant number.

When the filtering gain K is the non-compensation gain (=1), it may indicate that no steering vibrations occur. Thus, the adaptive damping torque calculation unit 46 may set the adaptive damping gain to 1, and output the damping torque TDamping which is not compensated for.

The adaptive damping gain may have a predetermined upper limit in order to prevent an output of excessive adaptive damping torque TAdaptiveDamping, and the upper limit may be set to various values depending on the specifications of the vehicle and MDPS motor and the designer's intent. Therefore, the adaptive damping gain may be set to a value which is equal to or greater than 1 and corresponds to a range below the upper limit.

In the above-described configuration, the adaptive damping torque calculation unit 46 may calculate the adaptive damping torque TAdaptiveDamping by multiplying the adaptive damping gain by the damping torque TDamping. In another exemplary embodiment, however, adaptive damping torque calculation unit 46 may calculate the adaptive damping torque TAdaptiveDamping by adding a present damping assist torque corresponding to the filtering gain K to the damping torque TDamping.

The controller 40 may calculate the final assist torque TAssist based on the main assist torque TMainAssist and the adaptive damping torque TAdaptiveDamping.

In the present exemplary embodiment, the vibration analysis unit 41, the filtering gain calculation unit 42, the column torque compensation unit 43, the main assist torque calculation unit 44, the damping torque calculation unit 45 and the adaptive damping torque calculation unit 46 may be implemented as separate components. In another exemplary embodiment, however, the vibration analysis unit 41, the filtering gain calculation unit 42, the column torque compensation unit 43, the main assist torque calculation unit 44, the damping torque calculation unit 45 and the adaptive damping torque calculation unit 46 may be integrated into the controller 40.

Figure 3:
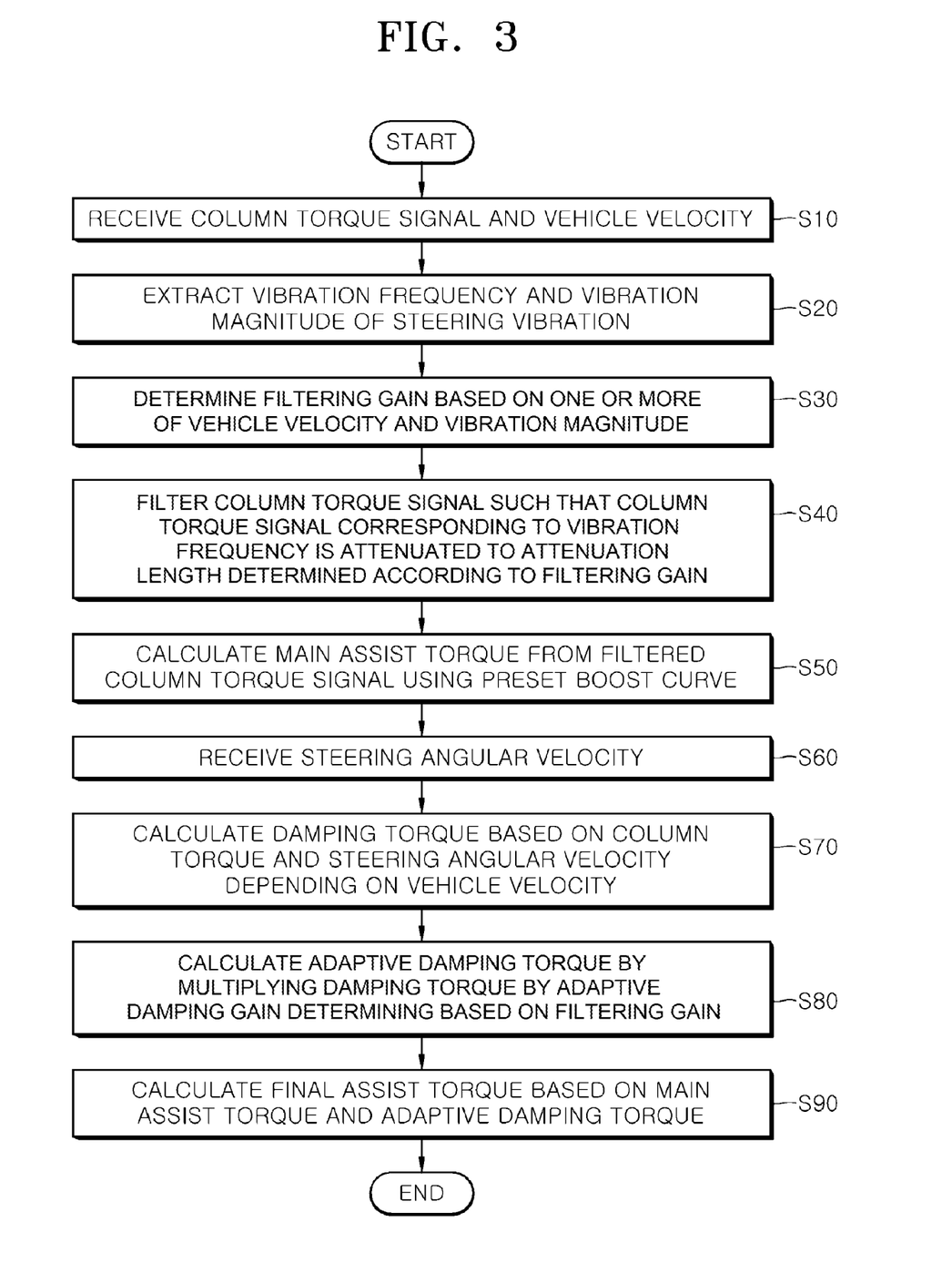
FIG. 3 is a flowchart illustrating a method for compensating for a column torque in an MDPS system in accordance with an exemplary embodiment of the present invention.

FIG. 3 is a flowchart illustrating a method for compensating for a column torque in an MDPS system in accordance with an exemplary embodiment of the present invention.

Referring to FIG. 3, the method for compensating for a column torque in an MDPS system will be described as follows. First, the controller 40 may receive a column torque signal Tcol and a vehicle velocity Vvehicle from the column torque sensor 10 and the vehicle velocity sensor 20, respectively, at step S10.

Then, the controller 40 may extract the vibration frequency freq_vibr and vibration magnitude mag_vibr of a steering vibration from the column torque signal Tcol, the steering vibration being caused in the steering apparatus, at step S20.

At this time, the controller 40 may extract the vibration frequency freq_vibr and the vibration magnitude mag_vibr using DFT (Discrete Fourier Transform).

Then, the controller 40 may determine a filtering gain K based on the vehicle velocity Vvehicle at step S30. The filtering gain may be defined as an index indicating the attenuation degree of the filtered column torque signal, and determine the attenuation length of the column torque signal corresponding to the vibration frequency freq_vibr.

Specifically, the controller 40 may determine the filtering gain K based on the vehicle velocity Vvehicle and the preset vehicle velocity-filtering gain map containing information on a vibration occurrence velocity section where steering vibrations occur. The vehicle velocity-filtering gain map may indicate may indicate mapping information between a vehicle velocity and a filtering gain for differently attenuating a steering vibration which occurs with a different magnitude depending on the vehicle velocity. When the vehicle velocity Vvehicle is not included in the vibration occurrence velocity section, the filtering gain K may be set to the preset non-compensation gain, and when the vehicle velocity Vvehicle is included in the vibration occurrence velocity section, the filtering gain K may be set to a positive number smaller than the non-compensation gain.

As described above, the filtering gain K may be determined based on the vehicle velocity, but the vehicle velocity-filtering gain map may not reflect the actual magnitude of a steering vibration which is currently occurring. Therefore, the controller 40 may further consider the extracted vibration magnitude mag_vibr in order to improve the accuracy of the filtering gain calculation process.

Specifically, when the vehicle velocity Vvehicle is included in the vibration occurrence velocity section, the controller 40 may determine the filtering gain K by further considering the extracted vibration magnitude mag_vibr. For larger vibration magnitudes mag_vibr, the filtering gain K may be set to a smaller value. That is, the filtering gain calculation unit 42 may further consider the actual vibration magnitude mag_vibr of the current steering vibration for the filtering gain K based on the vehicle velocity-filtering gain map, and compensate for the filtering gain K according to the vibration magnitude mag_vibr, thereby more effectively attenuating the vibration component contained in the column torque signal Tcol. Since the process of deciding the filtering gain K based on the vehicle velocity and the vibration magnitude mag_vibr has been described above, the detailed descriptions thereof are omitted herein.

In another exemplary embodiment of the present invention, the controller 40 may determine the filtering gain K based on only the extracted vibration magnitude mag_vibr. That is, the controller 40 may determine the filtering gain K corresponding to the extracted vibration magnitude mag_vibr without considering the vehicle velocity Vvehicle sensed by the vehicle velocity sensor, and attenuate the vibration component of the column torque signal Tcol, which has the extracted vibration magnitude mag_vibr, from the extracted vibration frequency freq_vibr. In this case, the vibration magnitude-filtering gain map for deciding the filtering gain K corresponding to the vibration magnitude mag_vibr may be set in the controller 40 in advance.

Then, the controller 40 may filter the column torque signal Tcol such that the column torque signal corresponding to the extracted vibration frequency freq_vibr is attenuated to an attenuation length which is determined according to the filtering gain K, at step S40.

At this time, the controller 40 may filter the column torque signal Tcol such that the attenuation length of the column torque signal corresponding to the vibration frequency freq_vibr increases as the filtering gain K decreases. For this operation, the controller 40 may filter the column torque signal Tcol through a lead-lag compensator that uses the vibration frequency freq_vibr as the center frequency and uses the filtering gain K as an attenuation factor. Therefore, the transfer function of the lead-lag compensator may be determined as expressed in Equation 3 above.

Therefore, when the vehicle velocity Vvehicle is included in the vibration occurrence velocity section such that the filtering gain K is set to a smaller value than the non-compensation gain (=1), the column torque signal corresponding to the vibration frequency freq_vibr may be attenuated to the attenuation length which is determined according to the filtering gain K, by the lead-lag compensator having the transfer function of Equation 3. As the filtering gain K is decreased, the attenuation length of the column torque signal corresponding to the vibration frequency freq_vibr may be increased to further reduce the vibration component. Furthermore, when the filtering gain K is set to the non-compensation gain (=1) because the vehicle velocity Vvehicle is not included in the vibration occurrence velocity section, the transfer functions of Equations 1 and 2 may be set to 1, and the filtering operation for the column torque signal Tcol may not be performed.

Then, the controller 40 may calculate a main assist torque TMainAssist from the filtered column torque signal using a preset boost curve at step S50.

Then, the controller 40 may receive a steering angular velocity ω of the steering wheel from the steering angle sensor 30 at step S60. However, steps S10 and S60 are parallel steps in which the controller 40 receives the column torque signal Tcol, the vehicle velocity Vvehicle and the steering angle ω through the respective sensors in real time. Therefore, steps S10 and S60 may not be limited to the above-described sequence.

Then, the controller 40 may calculate a damping torque TDamping based on the column torque and the steering angle ω depending on the vehicle velocity Vvehicle, at step S70.

Then, the controller 40 may calculate an adaptive damping torque TAdaptiveDamping by multiplying the damping torque TDamping by an adaptive damping gain, which is determined based on the filtering gain K, at step S80. The adaptive damping gain may be equal to or greater than 1. For smaller filtering gains K, the adaptive damping gain may be set to larger values below a preset upper limit. That is, the smaller the filtering gain K, the controller 40 may determine that the vibration component which needs to be attenuated from the column torque signal Tcol is larger, and set the adaptive damping gain to a larger value. Thus, since the adaptive damping torque TAdaptiveDamping is increased, the convergence of the steering wheel can be improved to effectively reduce steering vibrations which the driver feels from the steering wheel. On the other hand, when the filtering gain K is the non-compensation gain (=1), the controller 40 may determine that no steering vibrations occur. Thus, the controller 40 may set the adaptive damping gain to 1, and output the damping torque TDamping which is not compensated for.

The controller 40 may include a 2D map indicating the corresponding relation between the filtering gain K and the adaptive damping gain, a lookup table or a function of the adaptive damping gain with respect to the filtering gain K. Furthermore, a predetermined upper limit for preventing an excessive adaptive damping torque may be designed in various ways depending on the specifications of a vehicle and MDPS motor and the designer's intent, and set in the controller 40 in advance.

Then, the controller 40 may calculate the final assist torque TAssist based on the main assist torque TMainAssist and the adaptive damping torque TAdaptiveDamping, at step S90.

Steps S40 and S50 at which the controller 40 filters the column torque signal Tcol and calculates the main assist torque TMainAssist and steps S70 and S80 at which the controller 40 calculates the damping torque TDamping and the adaptive damping torque TAdaptiveDamping may be performed in parallel with each other, and are not limited to the above-described sequence.

In the disclosed exemplary embodiments, the apparatus and method may not only attenuate the column torque signal corresponding to the vibration frequency by providing the optimized vibration reduction filter depending on the vibration frequency and the filtering gain, which are determined in real time, but also output the adaptive damping torque to which the damping assist torque based on the filtering gain is added, thereby increasing the convergence of the steering wheel. Therefore, the apparatus and method can effectively reduce the response of the MDPS system to steering vibrations, thereby improving a driver's steering feel and the steering stability.

In accordance with the disclosed exemplary embodiments, the apparatus and method can replace a prior-art mechanical device for reducing vibrations of the steering system, thereby reducing the cost and simplifying the MDPS system. Furthermore, the apparatus and method can reduce the weight of the vehicle, thereby improving fuel efficiency. Furthermore, the apparatus and method can reduce vibrations according to the optimized vibration reduction logic, thereby improving a driver's steering feel and the steering stability.

The above describe method descriptions and the process flow diagrams are provided as illustrative examples and are not intended to require or imply that the steps of the various exemplary embodiments must be performed in the order presented. Instead, the order of steps in the foregoing exemplary embodiments may be performed in any order. Words such "after", "then," "next," etc. are merely intended to aid the reader through description of the methods.

The various illustrative logical blocks, modules, circuits, and algorithm steps described in connection with the exemplary embodiments may be implemented as electronic hardware, computer software, or combinations of both. In order to describe the interchangeability of hardware and software, various illustrative features, blocks, modules, circuits, and steps have been described above in terms of their general functionality. Whether such functionality is implemented as hardware or software depends upon the particular application and design constraints for the overall system. A person of ordinary skill in the art may implement the functionality in various ways for each particular application without departing from the scope of the present invention.

The hardware used to implement the various illustrative logics, logical blocks, modules, and circuits described in connection with the exemplary embodiments disclosed herein may be implemented or performed with a general purpose processor, a digital signal processor (DSP) an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof if implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory processor-readable storage medium or a non-transitory computer-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disc includes optically reproducible data such as a compact disc (CD), laser disc, optical disc, digital versatile disc (DVD), and blu-ray disc. Disk includes magnetically reproducible data such as a floppy disk. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for compensating for a column torque in an MDPS (Motor Driven Power Steering) system, comprising:

a column torque sensor configured to sense a column torque applied to a steering shaft and output a column torque signal;

a vehicle velocity sensor configured to sense a vehicle velocity; and a controller configured to receive the column torque signal to extract a vibration frequency of steering vibration caused in a steering apparatus, determine a filtering gain based on the vehicle velocity sensed by the vehicle velocity sensor, and filter the column torque signal such that the column torque signal corresponding to the extracted vibration frequency is attenuated to an attenuation length which is determined according to the filtering gain, wherein the filtering gain comprises an index indicating the attenuation degree of the filtered column torque signal.

2. The apparatus of claim 1, wherein the controller filters the column torque signal such that the attenuation length of the column torque signal corresponding to the vibration frequency increases as the filtering gain becomes smaller.

3. The apparatus of claim 2, wherein:
the controller determines the filtering gain based on the vehicle velocity and a preset vehicle velocity-filtering gain map comprising information on a vibration occurrence velocity section where the steering vibration occurs; and
the vehicle velocity-filtering gain map comprises mapping information between a vehicle velocity and a filtering gain for differently attenuating steering vibration which occurs with a different magnitude depending on the vehicle velocity.

4. The apparatus of claim 3, wherein the vehicle velocity-filtering gain map is configured in such a manner that the filtering gain is set to a preset non-compensation gain when the vehicle velocity is not included in the vibration occurrence velocity section, and set to a positive number less than the non-compensation gain when the vehicle velocity is included in the vibration occurrence vehicle section.

5. The apparatus of claim 4, wherein the controller receives the column torque signal to extract the vibration magnitude of the steering vibration, determines the filtering gain by further considering the extracted vibration magnitude when the vehicle velocity is included in the vibration occurrence velocity section, and sets the filtering gain to a smaller value as the vibration magnitude becomes larger.

6. The apparatus of claim 5, wherein the controller extracts the vibration frequency and the vibration magnitude using DFT (Discrete Fourier Transform).

7. The apparatus of claim 4, wherein the controller filters the column torque signal using a lead-lag compensator having a transfer function that uses the vibration frequency as a center frequency and uses the filtering gain as an attenuation factor.

8. The apparatus of claim 7, wherein the non-compensation gain is set to 1.

9. The apparatus of claim 2, further comprising a steering angle sensor configured to sense a steering angular velocity of the steering wheel, wherein:
the controller receives the column torque signal, the vehicle velocity, and the steering angular velocity from the column torque sensor, the vehicle velocity sensor, and the steering angle sensor, respectively, calculates a damping torque based on the column torque and the steering angular velocity depending on the vehicle velocity, and calculates an adaptive damping torque by multiplying the damping torque by an adaptive damping gain which is determined based on the filtering gain; and the adaptive damping gain is equal to or more than 1, and set to a larger value below a preset upper limit, as the filtering gain becomes smaller.

10. The apparatus of claim 9, wherein the controller calculates a main assist torque from the filtered column torque signal using a preset boost curve, and calculates a final assist torque based on the main assist torque and the adaptive damping torque.

11. A method for compensating for a column torque in an MDPS system, comprising:
receiving, by a controller implemented by a processor, a column torque signal and a vehicle velocity from a column torque sensor and a vehicle velocity sensor, respectively;
analyzing, by the controller, a steering vibration by extracting a vibration frequency of the steering vibration caused in a steering apparatus from the column torque signal;
determining, by the controller, a filtering gain based on the vehicle velocity; and
filtering, by the controller, the column torque signal such that the column torque signal corresponding to the extracted vibration frequency is attenuated to an attenuation length which is determined according to the filtering gain,
wherein:
the filtering gain is an index indicating an attenuation degree of the filtered column torque signal; and
in the filtering of the column torque signal, the controller filters the column torque signal such that the attenuation length of the column torque signal corresponding to the vibration frequency increases as the filtering gain becomes smaller.

12. The method of claim 11, wherein:
in the determining of the filtering gain, the controller determines the filtering gain based on the vehicle velocity and a preset vehicle velocity-filtering gain map comprising information on a vibration occurrence velocity section where the steering vibration occurs; and
the vehicle velocity-filtering gain map comprises mapping information between a vehicle velocity and a filtering gain for differently attenuating steering vibration which occurs with a different magnitude depending on the vehicle velocity.

13. The method of claim 12, wherein the vehicle velocity-filtering gain map is configured in such a manner that the filtering gain is set to a preset non-compensation gain when the vehicle velocity is not included in the vibration occurrence velocity section, and set to a positive number less than the non-compensation gain when the vehicle velocity is included in the vibration occurrence vehicle section.

14. The method of claim 13, wherein:
in the analyzing of the steering vibration, the controller further extracts the vibration magnitude of the steering vibration from the column torque signal; and
in the deciding of the filtering gain, the controller determines the filtering gain by further considering the extracted vibration magnitude when the vehicle velocity is included in the vibration occurrence velocity section, and sets the filtering gain to a smaller value as the vibration magnitude becomes larger.

15. The method of claim 14, wherein, in the analyzing of the steering vibration, the controller extracts the vibration frequency and the vibration magnitude using DFT.

16. The method of claim 15, wherein, in the filtering of the column torque signal, the controller filters the column torque signal using a lead-lag compensator having a transfer function that uses the vibration frequency as a center frequency and uses the filtering gain as an attenuation factor, and the non-compensation gain is set to 1.

17. The method of claim 11, further comprising:

receiving, by the controller, a steering angular velocity of a steering wheel from a steering angle sensor;

calculating, by the controller, a damping torque based on the column torque and the steering angular velocity depending on the vehicle velocity; and calculating, by the controller, an adaptive damping torque by multiplying the damping torque by an adaptive damping gain which is determined based on the filtering gain, wherein the adaptive damping gain is equal to or greater than 1, and set to a larger value below a preset upper limit, as the filtering gain becomes smaller.

18. The method of claim 17, further comprising:

calculating, by the controller, a main assist torque from the filtered column torque signal using a preset boost curve; and calculating a final assist torque based on the main assist torque and the adaptive damping torque.

* * * * *